United States Patent [19]

Tanaka et al.

[11] Patent Number: 4,892,678
[45] Date of Patent: Jan. 9, 1990

[54] THIOPHENE DERIVATIVE POLYMER AND A POLYMER COMPOSITION THEREOF

[75] Inventors: Susumu Tanaka; Masaaki Sato, both of Tsukuba; Kyoji Kaeriyama, Tsuchiura; Yoshio Suda, Hachioji; Takao Hiraide, Tochigi, all of Japan

[73] Assignee: Agency of Industrial Science & Technology, Ministry of International Trade & Industry, Tokyo, Japan

[21] Appl. No.: 306,581

[22] Filed: Feb. 6, 1989

Related U.S. Application Data

[62] Division of Ser. No. 155,274, Feb. 12, 1988.

[30] Foreign Application Priority Data

Feb. 19, 1987 [JP]  Japan ................... 62-36816

[51] Int. Cl.$^4$ ................... H01B 1/00; H01B 1/06
[52] U.S. Cl. ................... 252/500; 252/518; 526/256; 526/257; 524/80; 524/401; 524/404; 524/415; 524/418; 524/421; 524/423; 524/157; 524/408; 524/316; 528/490; 528/491
[58] Field of Search ................... 252/500, 518; 524/80, 524/401, 404, 405, 415, 414, 421, 423, 418, 395, 408, 157, 316; 528/380, 379, 378, 490, 491; 526/256, 257

[56] References Cited

U.S. PATENT DOCUMENTS

| 4,599,194 | 7/1986 | Frommer et al. | 252/518 |
| 4,691,005 | 9/1987 | Sato et al. | 528/380 |
| 4,711,742 | 12/1987 | Jen et al. | 252/500 |

*Primary Examiner*—Josephine Barr
*Attorney, Agent, or Firm*—Oblon, Spivak, McClelland, Maier & Neustadt

[57] ABSTRACT

A thiophene derivative polymer comprising repeating units of the formula:

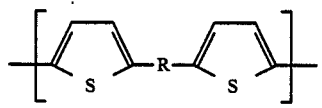

(wherein R stands for one member selected from the group consisting of

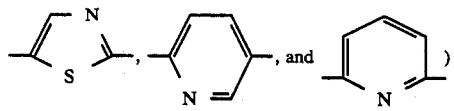

and a polymer composition having the polymer doped with an anion and consequently possessing a semiconducting characteristic.

4 Claims, No Drawings

THIOPHENE DERIVATIVE POLYMER AND A POLYMER COMPOSITION THEREOF

This is a division of application Ser. No. 07/155,274, filed Feb. 12, 1988.

BACKGROUND OF THE INVENTION

1. Field of the Invention

This invention relates to a novel thiophene derivative polymer and a thiophene derivative polymer composition obtained by doping the polymer with an anion. The polymer composition exhibits electric properties which make it suitable as a semiconductor. Further, the polymer composition and the polymer possess special colors.

2. Prior Art Statement

In recent years, display devices have come to play an important role as input and output means. The most widely used type of display device uses a video tube. Such tubes, however, have a disadvantage in that they have large size and weight and consume much electric power. As a consequence, liquid crystal displays and electrochromic displays have been studied and developed to take the place of video tubes.

In parallel with this electronic technology is being incorporated in many kinds of equipment. As a result, such equipment can be reduced in size and improved in performance. The success in the incorporation of electronic technology is ascribable in a great measure to the development of semiconductors, integrated circuits, and LSI's. Display materials and electronic materials are expected to find expanding applications and demand for such materials is expected to grow in the future. Thus the development of new semiconductor materials is important and studies are being continued on both organic and inorganic materials. Macromolecular semiconductors are therefore being studied because of their potentially extensive utility.

Heretofore, as macromolecular semiconductors, such polymers as polyacetylene and polyphenylene to which a semiconducting property is imparted by the incorporation of an electron acceptor [Journal of the American Chemical Society, Vol. 100, page 1013 (1978) and Synthetic Metal, Vol. 1, page 307 (1980)] and poly(3-methylthiophene) doped with an anion [Synthetic Metal, Vol. 14, page 279 (1986)] have been known to the art.

These organic semiconductors are generally deficient in stability and heat-resisting property and, therefore, can be used only in limited applications. Since they emit colors only in limited hues when used in displays, their utility in this field is also limited.

Polyacetylenes are highly susceptible to the action of oxygen and instable in the air. They thus have a problem from the standpoint of practical use. Doped polymer of poly(3-methylthiophene) can be easily obtained in the form of a film on the surface of an electrode by the electrolytic polymerization process. The film thus obtained, however, needs further improvement because it does not have a smooth surface and is low in heat-resisting property.

Polythiophene heretofore used as an electrochromic display material can emit only two hues, red in the neutral state and blue when doped with an anion [Japanese Journal of Applied Physics, Vol. 22, page 412 (1983)].

OBJECT AND SUMMARY OF THE INVENTION

An object of this invention is to provide a novel organic semiconductor which exhibits stability in the air, enjoys improvement in heat-resisting property and smoothness of film, and emits colors in a wide variety of hues.

The inventors continued a study for developing an organic semiconductor answering the foregoing description. They have found, as the result, that a polymer composition produced by doping with an anion a polymer which has as a repeating unit thereof a group containing another heterocycle to be interposed between adjacent thiophene rings possesses a semiconducting characteristic. They have further confirmed that this composition and the polymer both emit peculiar colors of their own. This invention has been perfected as a result.

Specifically, this invention is directed to a thiophene derivative polymer comprising repeating units represented by the formula:

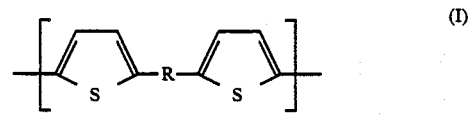

(wherein R stands for one member selected from the group consisting of

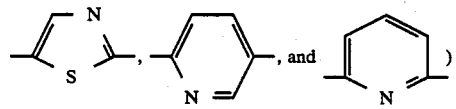

and to a polymer composition obtained by doping the aforementioned polymer with an anion.

DETAILED DESCRIPTION OF THE PREFERRED EMBODIMENTS

The polymer and the polymer composition of the present invention are novel substances not published in any literature. The polymer which is in a neutral state and the polymer composition which is produced by doping this polymer with an anion and consequently is in an oxidized state possess peculiar colors, depending on their respective states, and can be utilized as display materials. They are electrical insulators in their neutral state and assume a semiconducting property in their oxidized state.

As examples of the anion with which the polymer can be doped effectively in this invention, there can be cited tetrafluoroborate ion, perchlorate ion, hexafluorophosphate ion, hexafluoroarsenate ion, iodine ion, bromine ion, chlorine ion, fluorine ion, sulfate ion, hydrogensulfate ion, trifluoroacetate ion, and p-toluenesulfonate ion.

The polymer and the polymer composition of the present invention are novel compounds. They are insoluble in solvents and, when heated, are decomposed instead of being dissolved. Thus, their molecular weights and polymerization degrees are very difficult to determine. The polymerization degrees are thought to fall roughly in the range of 10 to 500 and the molecular weights in the range of 2,000 to 100,000.

The polymer of this invention, whether in an oxidized state (polymer composition) or in a neutral state, assumes hues different from polythiophene and, therefore, can be used as a display material.

Polythiophene in a neutral state assumes a red color and in a state doped with tetrafluoroborate ion, for example, assumes a blue color.

The polymer of this invention having

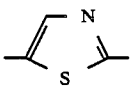

as the substituent R assumes a yellow color and the polymer composition obtained by doping this polymer with tetrafluoroborate ion assumes a brown color.

The polymer having

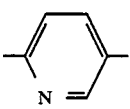

as the substituent R assumes a yellowish orange color and the polymer composition obtained by doping this polymer with tetrafluoroborate ion assumes a grayish black color.

The polymer having

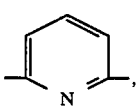

as the substituent R assumes a brown color and the polymer composition obtained by doping this polymer assumes a blackish brown color.

The polymer composition exhibits electroconductivity ranging from $10^{-5}$ up to $10^{-2}$ S/cm and high stability to the air and, therefore, can be applied as an electromagnetic wave-shielding material, electrode material, and solar cell material.

The film made of the polymer having

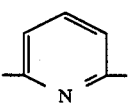

as the substituent R possesses a smooth surface and excels in heat-resisting property.

Further, the polymer composition possesses the following characteristic properties as an organic semiconductor.

While the polymer by itself is an insulator, the polymer composition obtained by doping the polymer with an anion assumes a positive electric charge and, therefore, exhibits the properties of a semiconductor. The electroconductivity of the polymer composition is in the range of $10^{-2}$ to $10^{-5}$ S/cm.

The polymer composition exhibits practically desirable properties when the anion content thereof is in the range of 10 to 50% by weight.

The polymer and the polymer composition have been identified by means of infrared absorption spectrum.

Now, the method used for the production of the polymer and the polymer composition will be described below.

The polymer of the present invention can be produced by subjecting a compound of the formula:

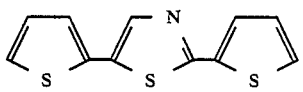 (II)

or a compound of the formula:

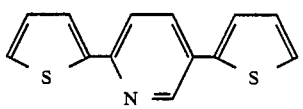 (III)

or a compound of the formula:

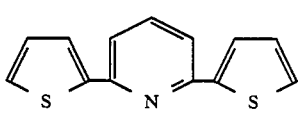 (IV)

to electrolytic polymerization.

The electrolytic polymerization is carried out in the presence of a supporting electrolyte. The product of the electrolytic polymerization is doped with an anion originating in the supporting electrolyte. Thus, this product is a polymer composition.

When this product is electrolyzed with the polarity reversed, the thiophene derivative polymer aimed at by this invention is obtained in a state deprived of the dopant.

Advantageously, the electrolytic polymerization is carried out in a polar solvent under the atmosphere of an inert gas. As examples of the polar solvent which proves to be favorable for the electrolytic polymerization, there can be cited acetonitrile, nitrobenzene, nitromethane, benzonitrile, propylene carbonate, tetrahydrofuran, methylene chloride, dimethyl sulfoxide, dimethyl formamide, hexamethylphosphor triamide, 1-methyl-2-pyrrolidinone, dimethyl sulfate, and diethyl sulfate. As the inert gas for the atmosphere of the electrolytic polymerization, nitrogen, argon, or other inert gas is used. By carrying out the reaction under the atmosphere of such an inert gas, the intermediate of the reaction can be prevented from reacting with oxygen and consequently giving rise to a secondary product.

As the electrode, besides such precious metal as gold or platinum, a glass electrode produced by vacuum depositing indic oxide or stannic oxide on the surface of glass sheet can be used.

As examples of the supporting electrolyte effectively usable herein, there can be cited tetramethyl ammonium tetrafluoroborate, tetraethyl ammonium tetrafluoroborate, tetra-n-butyl ammonium tetrafluoroborate, lithium tetrafluoroborate, tetramethyl ammonium perchlorate, tetraethyl ammonium perchlorate, tetra-n-butyl ammonium perchlorate, lithium perchlorate, tetramethyl ammonium hexafluorophosphate, tetra-n-butyl ammonium hexafluorophosphate, sodium hexafluorophosphate, tetra-n-butyl ammonium hexafluoroarsenate, sodium hexafluoroarsenate, sulfuric acid, tetramethyl ammonium hydrogen sulfate, tetra-n-butyl ammonium hydrogen sulfate, sodium trifluoroacetate, tetramethyl ammonium p-toluenesulfonate, and tetra-n-butyl ammonium p-toluenesulfonate.

The compound of the aforementioned formula (II) is a novel compound and is synthesized by causing magnesium metal to react with 2-bromothiophene thereby producing a Grignard reagent and then condensing the Grignard reagent in combination with 2,5-dibromothiazole.

The compound of the aforementioned formula (III) is likewise a novel compound and is synthesized by causing magnesium metal to react with 2-bromothiophene thereby producing a Grignard reagent and then condensing the Grignard reagent in combination with 2,5-dibromopyridine.

The concentration of the supporting electrolyte in the solvent is in the range of 0.01 to 1 mol/liter. If this concentration is less than the lower limit of this range, the electrolysis does not proceed smoothly. If the concentration exceeds the upper limit, then there is the possibility of impurities in the supporting electrolyte adversely affecting the polymerization.

The concentration of the monomer subjected to polymerization in the solvent system is in the range of 0.01 to 1 mol/liter.

The thiophene derivative polymer composition of the present invention is obtained by dissolving a thiophene derivative and a supporting electrolyte in a solvent and subjecting the resultant solution to electrolytic polymerization. This production is characterized by the fact that the polymerization of the monomer and the doping of the polymer are attained substantially by one step. When the product is further electrolyzed with the polarity reversed, the dopant is easily removed and the thiophene derivative polymer is obtained. The polymer or the polymer composition is obtained in the form of film deposited on the surface of the electrode. Since the thickness of the produced film can be adjusted by the amount of electricity fed to the electrolytic cell, no molding is required.

Now, the present invention will be described more specifically below with reference to working examples.

Referential Example 1 (Production of 2,5-di(2-thienyl)-thiazole:

When a three-neck 50-ml flask fitted with a reflux condenser, a stirrer, and a calcium chloride tube was charged with 6.45 g (40 m.mols) of 2-bromothiophene and 29 ml of dehydrated ether and then 1.06 g (44 m.mole) of a magnesium metal was added thereto, the resultant reaction mixture produced 2-thienyl magnesium bromide with evolution of heat. Under an atmosphere of nitrogen, 4.0 g (16 m.mols) of 2,5-dibromothiazole, 0.179 g (0.33 m.mol) of dichloro[1,3-bis(diphenylphosphino)propane]nickel, and 29 ml of dehydrated ether were added to the 2-thienyl magnesium bromide. The resultant mixture was placed and refluxed for 16 hours in a three-necked 100-ml flask fitted with a reflux condenser, a stirrer, and a calcium chloride tube. The reaction mixture was treated with 1N hydrochloric acid and the water layer separated from the organic layer was extracted with ether. The organic layer was added to the water layer extracted with ether. The resultant liquid was washed with water, cleaned with a saturated aqueous sodium hydrogen carbonate solution, and then washed again with water. The washed liquid layer was dried with anhydrous sodium sulfate, treated with activated carbon, and recrystallized twice with n-hexane, to produce 237 mg (5.8%) of yellow leaflike crystals of 2,5-di(2-thienyl)thiazole having a melting point of 93.0° to 93.8° C.

Elementary analyses (as $C_{11}H_7NS_3$); Calculated - C 52.98%, H 2.83%, N 5.62%, S 38.57%; Found - C 53.05%, H 2.51%, N 5.55%, S 38.54%

Referential Example 2 (production of 2,5-di(2-thienyl)pyridine):

2,5-di(2-thienyl)pyridine was obtained by following the procedure of Referential Example 1, except that 2,5-dibromopyridine was used in the place of 2,5-dibromothiazole. This product was recrystallized with ethanol, to obtain light yellow needle crystals having a melting point of 149.5° to 150.5° C.

Elementary analyses (as $C_{13}H_9NS_2$); Calculated - C 64.17%, H 3.73%, N 5.76%, S 26.35%; Found - C 64.19%, H 3.49%, N 5.70%, S 26.30%

EXAMPLE 1

In an electrolytic cell having a platinum plate ($1 \times 1 = 1$ cm$^2$) as a cathode and a glass electrode ($1 \times 1 = 1$ cm$^2$) an anode disposed as separated by 1 cm, 62 mg (0.25 m.mol) of 2,5-di(2-thienyl)thiazole, 82 mg (0.25 m.mol) of tetra-n-butyl ammonium tetrafluoroborate, and 5 ml of propylene carbonate were placed and dissolved. The solution was blown with argon for 15 minutes and then subjected to electrolytic polymerization at a current density of 1 mA/cm$^2$ and a polymerization temperature of 25° C. for 30 seconds. Consequently, a brown film of polymer composition doped with tetrafluoroborate ion was obtained on the anode. The film had a thickness of about 0.2 μm. When this polymer composition was further electrolyzed, with the polarity reversed, at a current density of 0.1 mA/cm$^2$ and a temperature of 25° C. for 30 seconds, the composition was deprived of tetrafluoroborate. Consequently, there was obtained a yellow filmlike polymer.

In the infrared absorption spectrum of the yellow filmlike polymer, there was found a band at 800 cm$^{-1}$ indicative of the presence of 2,5-di-substituted thiophene ring. The bands at 730 and 820 cm$^{-1}$ indicative of the presence of a 2,4-di-substituted thiophene ring were absent from this infrared absorption spectrum. Thus, the polymer was identified to be the polymer of

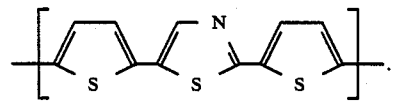

EXAMPLE 2

In an electrolytic cell having two platinum plates ($1 \times 1 = 1$ cm$^2$) disposed as separated by 1 cm, 62 mg (0.25 m.mol) of 2,5-di(2-thienyl)thiazole, 82 mg (0.25 m.mol) of tetra-n-butyl ammonium tetrafluoroborate, and 5 ml of propylene carbonate were placed and dissolved. The resultant solution was blown with argon for 15 minutes and then subjected to electrolytic polymerization at a current density of 1 mA/cm$^2$ and a polymerization temperature of 25° C. for 2 hours. Consequently, a blackish brown filmlike polymer composition doped with tetrafluoroborate ion was obtained as deposited on the anode. This film had a thickness of 18 μm. It showed electroconductivity of $6.3 \times 10^{-5}$ S/cm.

EXAMPLE 3

In an electrolytic cell having two glass electrodes (1×1=1 cm²) disposed as separated by 1 cm, 122 mg (0.5 m.mol) of 2,5-di(2-thienyl)pyridine, 82 mg (0.25 m.mol) of tetra-n-butyl ammonium tetrafluoroborate, and 5 ml of nitrobenzene were placed and dissolved. The resultant solution was blown with argon for 15 minutes and then subjected to electrolytic polymerization at a current density of 1 mA/cm² and a polymerization temperature of 25° C. for 1 minute. Consequently, a grayish black filmlike polymer composition doped with tetrafluoroborate ion was obtained as deposited on the anode. This film had a thickness of about 1 μm. When this polymer composition was further electrolyzed, with the polarity reversed, at a current density of 1 mA/cm² and a temperature of 25° C. for 60 seconds, the composition was deprived of tetrafluoroborate. Thus, there was obtained a yellowish orange filmlike polymer.

In the infrared absorption spectrum of this yellowish orange filmlike polymer, there was found a band at 800 cm$^{-1}$ indicative of the presence of 2,5-di-substituted thiophene ring. The bands at 730 and 820 cm$^{-1}$ indicative of the presence of a 2,4-substituted thiophene ring were absent from this infrared absorption spectrum. Thus, this polymer was identified to be the polymer of

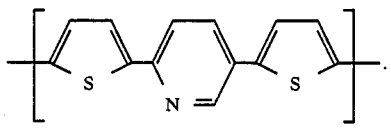

EXAMPLE 4

In the same electrolytic cell as described in Example 1, 122 mg (0.5 m.mol) of 2,5-di(2-thienyl)pyridine, 82 mg (0.25 m.mol) of tetra-n-butyl ammonium tetrafluoroborate, and 5 ml of nitrobenzene were placed and dissolved. The resultant solution was blown with argon for 15 minutes and then subjected to electrolytic polymerization at a current density of 1 mA/cm² and a polymerization temperature of 25° C. for 5 minutes. Consequently, a grayish black filmlike polymer composition doped with tetrafluoroborate ion was obtained as deposited on the anode. When this polymer composition was further electrolyzed, with the polarity reversed, at a current density of 1 mA/cm² at a temperature of 25° C., it was deprived of the dopant. Consequently, there was obtained a reddish brown filmlike polymer. When this filmlike polymer was exposed to the vapor of iodine, there was obtained a polymer doped with iodine ion. This polymer showed electroconductivity of 6.0×10$^{-3}$ S/cm.

EXAMPLE 5

In the same electrolytic cell as described in Example 1, 122 mg (0.5 m.mol) of 2,5-di(2-thienyl)pyridine, 85 mg (0.25 m.mol) of tetra-n-butyl ammonium perchlorate, and 5 ml of nitrobenzene were placed and dissolved. The resultant solution was blown with argon for 15 minutes and then subjected to electrolytic polymerization at a current density of 1 mA/cm² and a polymerization temperature of 25° C. for 5 minutes. Consequently, a grayish black filmlike polymer composition doped with perchlorate ion was obtained as deposited on the anode. When the polymer composition was further electrolyzed, with the polarity reversed, at a current density of 1 mA/cm² and a temperature of 25° C., there was obtained a reddish brown filmlike polymer deprived of the dopant.

EXAMPLE 6

In the same electrolytic cell as described in Example 3, 122 mg (0.5 m.mol) of 2,6-di(2-thienyl)pyridine, 82 mg (0.25 m.mol) of tetra-n-butyl ammonium tetrafluoroborate, and 5 ml of nitrobenzene were placed and dissolved. The resultant solution was blown with argon and then subjected to electrolytic polymerization at a current density of 1 mA/cm² and a polymerization temperature of 25° C. for 2 minutes. Consequently, a blackish brown filmlike polymer composition doped with tetrafluoroborate ion was obtained as deposited on the anode. This filmlike polymer composition had a thickness of about 1 μm. When this polymer composition was further electrolyzed with the polarity reversed, there was obtained a brown polymer deprived of the dopant.

In the infrared absorption spectrum of the brown filmlike polymer, a band at 800 cm$^{-1}$ indicative of the presence of a 2,5-di-substituted thiophene ring was observed. The oands at 730 and 820 cm$^{-1}$ indicative of the presence of a 2,4-di-substituted thiophene ring were not found. Thus, the polymer was identified to be the polymer of

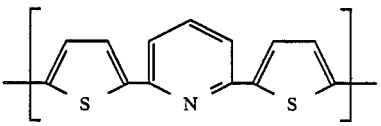

The film of this polymer had a very smooth surface. The surface smoothness of this film was higher than that of any other film obtained by electrolytic polymerization as reported in literature to date. Table 1 shows the results of thermogravimetric analysis of the polymer as compared with that of poly(3-methylthiophene).

TABLE 1

| Gravimetric residual ratio of polymer (%) | | | | | |
|---|---|---|---|---|---|
| Temperature (°C.) | 200 | 300 | 400 | 500 | 600 |
| Poly[2,6-di(thienyl)pyridine] | 100 | 100 | 99 | 99 | 94 |
| Poly(3-methylthiophene) | 100 | 98 | 96 | 90 | 73 |

From this table, it can be clearly noted that the polymer showed better thermal stability than poly(3-methylthiophene), a substance heretofore accepted as possessing relatively high stability.

EXAMPLE 7

In the same electrolytic cell as described in Example 1, 122 mg (0.5 m.mol) of 2,6-di(2-thienyl)pyridine, 82 mg (0.25 m.mol) of tetra-n-ammonium tetrafluoroborate, and 5 ml of nitrobenzene were placed and dissolved. The resultant solution was blown with argon for 15 minutes and then subjected to electrolytic polymerization at a current density of 1 mA/cm² and a polymerization temperature of 25° C. for 5 minutes. Consequently, a blackish brown filmlike polymer composition doped with tetrafluoroborate ion was obtained as deposited on the anode. When this polymer composition was further electrolyzed with the polarity reversed, there was obtained a brown filmlike polymer deprived of the dopant. When this polymer was exposed to the vapor of iodine, it was doped with iodine ion. This polymer had an electroconductivity of $1.3 \times 10^{-2}$ S/cm.

EXAMPLE 8

In the same electrolytic cell as described in Example 1, 122 mg (0.5 m.mol) of 2,6-di(2-thienyl)pyridine, 97 mg (0.25 m.mol) of tetra-n-butyl ammonium hexafluorophosphate, and 5 ml of nitrobenzene were placed and dissolved. The resultant solution was blown with argon for 15 minutes and then subjected to electrolytic polymerization at a current density of 1 mA/cm² and a polymerization temperature of 25° C. for 5 minutes. Consequently, a blackish brown filmlike polymer composition doped with hexafluorophosphate ion was obtained as deposited on the anode. When this polymer composition was further electrolyzed with the polarity reversed, there was obtained a brown filmlike polymer deprived of the dopant.

What is clamied is:

1. A thiophene derivative polymer composition, comprising:

a polymer having repeating units of the formula:

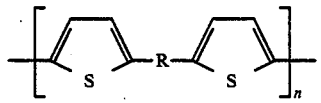

wherein n denotes a number within the range of about 10 to 500 and R represents a member selected from the group consisting of

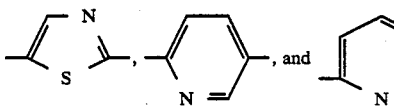

doped with at least one anion selected from the group consisting of the tetrafluoroborate ion, perchlorate ion, hexafluorophosphate ion, hexafluoroarsenate ion, iodide, bromide, chloride, fluoride, sulfate, hydrogen sulfate, trifluoroacetate and p-toluenesulfonate in an amount within the range of 10 to 50% by weight.

2. The thiophene derivative composition according to claim 1, wherein R is

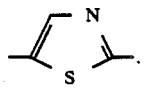

3. The thiophene derivative composition according to claim 1, wherein R is

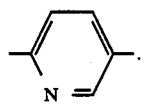

4. The thiophene derivative composition according to claim 1, wherein R is

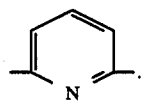

* * * * *